Sept. 9, 1930.  F. AESCHBACH  1,775,220
DEVICE FOR TILTING TROUGHS OF DOUGH KNEADING AND MIXING MACHINES
Filed July 15, 1929  2 Sheets-Sheet 1

INVENTOR:
Friedrich Aeschbach
By Henry Orth Jr
Atty.

Sept. 9, 1930.　　　　F. AESCHBACH　　　　1,775,220
DEVICE FOR TILTING TROUGHS OF DOUGH KNEADING AND MIXING MACHINES
Filed July 15, 1929　　　2 Sheets-Sheet 2
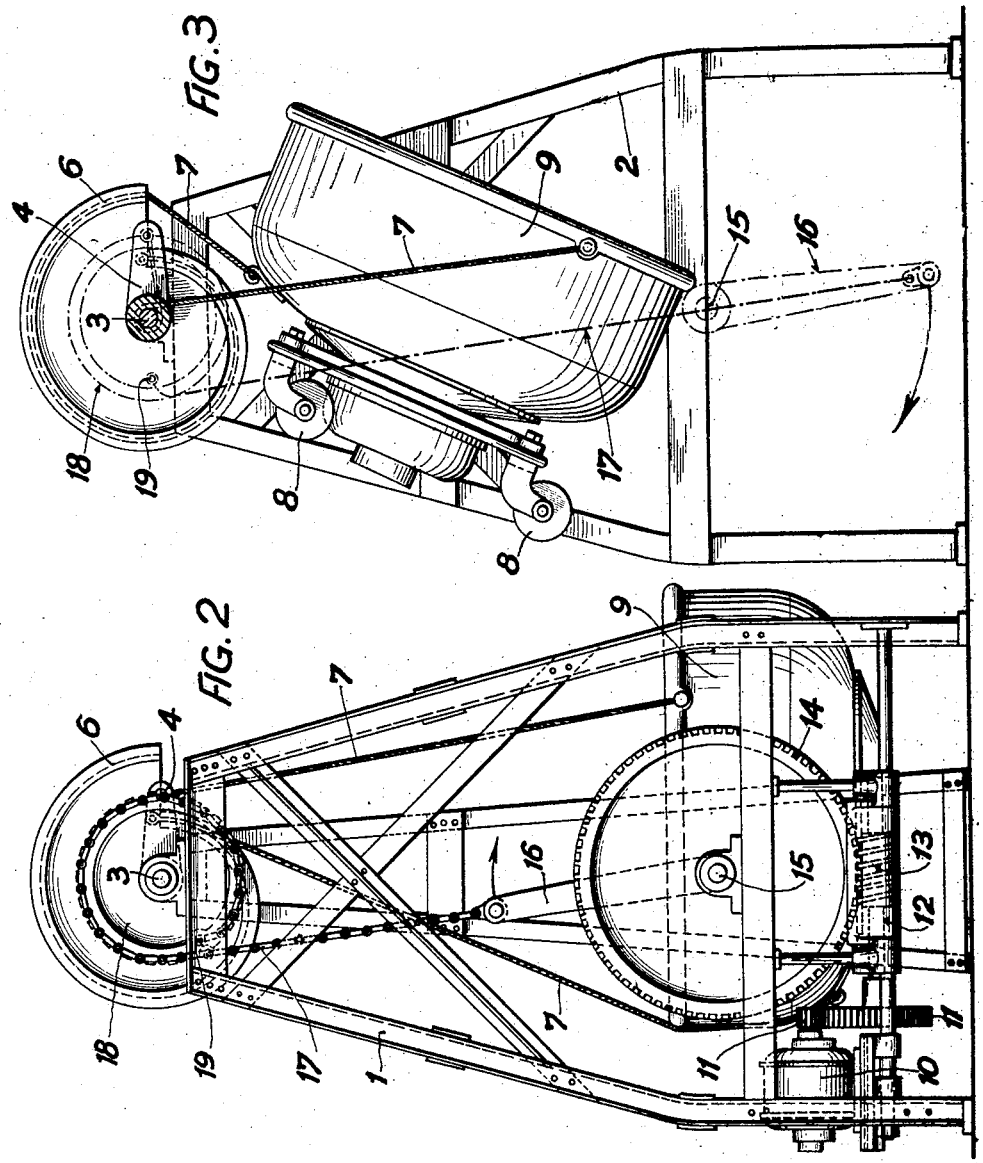
INVENTOR:
Friedrich Aeschbach
by Henry Orth Jr.
atty.

Patented Sept. 9, 1930

1,775,220

UNITED STATES PATENT OFFICE

FRIEDRICH AESCHBACH, OF AARAU, SWITZERLAND

DEVICE FOR TILTING TROUGHS OF DOUGH KNEADING AND MIXING MACHINES

Application filed July 15, 1929, Serial No. 378,489, and in Switzerland May 28, 1929.

Devices for the tilting of troughs, particularly of dough kneading and mixing machines, comprising a horizontal shaft provided with two crank arms and a disk with a spiral-shaped circumference, are known, wherein the rotation of the horizontal shaft causes the trough to be raised and tilted by means of cables or chains respectively. Heretofore, in tilting devices of this type the drive of the said horizontal shaft was effected either manually or by a motor. When large troughs and manually operable driving means are involved the considerable weight to be lifted requires a large ratio of gearing for the driving device to exert the necessary effort so that, in consequence thereof, the tilting is effectuable only in considerable time. On the other hand in the motor driven gearings, heretofore used, appliances such as a reverse gear and the like were necessitated in order to effect the reversing of the movement; furthermore, the operator was compelled to take care for the reverse gear to be actuated or the motor to be cut out exactly in the right moment.

The object of the present invention is to eliminate this drawback in that in a tilting device according to the invention the horizontal shaft is actuated by means of a tension member cooperating with the periphery of a further disk on the said shaft and fastened to the periphery and to a motor driven arm rotating during the entire tilting operation, whereby the tilting position and the beginning of the lifting motion of the trough coincide with the two dead-center positions of the said arm.

As the tilting position and the beginning of the lifting motion of the trough coincide with the two dead-centre positions of the arm the trough remains for a sufficient length of time in the tilted position, even when the speed of its raising and lowering movement is relatively great, so as to permit the dough to run off.

In the accompanying drawing an embodiment of the invention is shown by way of example, in which:

Fig. 2 is an end view seen from the left in Fig. 1 and

Fig. 3 shows a section through the device on the line III—III in Fig. 1 with the trough in the tilting position.

Figure 1:
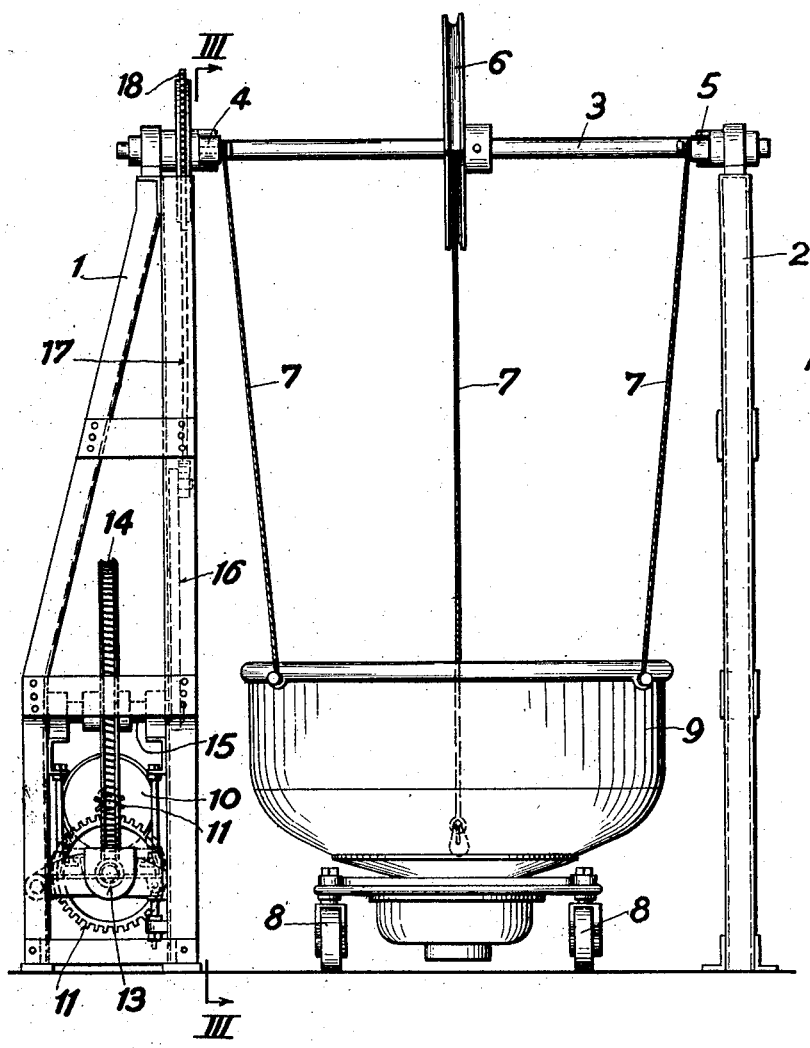
Fig. 1 is an elevation of the tilting device with the trough in its position which corresponds to the beginning of the lifting motion.

The tilting device comprises a frame formed by two standards 1 and 2 in which is mounted a horizontal shaft 3. The latter carries two crank arms 4 and 5 as well as a disk or snail 6 having a spiral-shaped circumference. To the crank arms 4 and 5 and to the disk 6 ropes or chains 7 are attached which for the purpose of lifting and tilting the trough 9, which has been wheeled into the tilting device by means of a carriage 8, are adapted to be fastened to the said trough. When the shaft 3 is turned the trough is lifted by action of the cranks 4 and 5, the disk 6 and the ropes 7 to be conveyed into the tilting position, as shown in Fig. 3.

The shaft 3 is rotated by an electro-motor 10 which by way of a gearing 11, actuates a shaft 12 to which a worm 13 is fixed. The latter meshes with a worm wheel 14 connected to a shaft 15 to which an arm 16 is keyed. The outer end of the arm 16 is linked to a chain 17 which cooperates with a disk 18 fixed to the shaft 3 and serving as a chain wheel on the circumference of which the one end of the said chain is fastened, as at 19.

When the motor 10 is started the arm 16 is caused to turn about the shaft 15 and the shaft 3 is rotated by means of the chain 17. The disposition of the arm 16 is such that the upper dead-centre thereof corresponds to the beginning of the lifting motion of the trough (Figs. 1 and 2) and the lower dead-centre to the extreme tilting position of the trough (Fig. 3). The circumference of the chain wheel 18 is somewhat longer than the double length of the arm 16 so that a safe operation is ensured. Thereby, the trough remains in its tilting position for a sufficient length of time to enable the dough, the discharge of which begins before the extreme tilting position is reached, to completely run off. A reversing gear is not necessary as when the arm has passed its lower dead center position the lowering movement of the trough begins automatically.

I claim:

1. A device for tilting the troughs, particularly of dough kneading and mixing machines, comprising in combination, a frame, a horizontal shaft mounted in said frame, two crank arms and a disk having a spiral shaped circumference fixed to said shaft, a flexible pulling member fixed with one end to each crank arm and to said disk and adapted to be connected at its other end to a trough to be tilted, and means to impart a turning motion to said shaft to effect the raising and tilting of a trough, which means include a winding member on said shaft, a rotatable arm, and a flexible pulling member connected to said winding member and said arm, said arm being so arranged that the tilting position and the beginning of the lifting motion of the trough coincide with the two dead-center positions of the said arm.

2. A device for tilting the troughs, particularly of dough kneading and mixing machines, comprising in combination, a frame, a horizontal shaft mounted in said frame, two crank arms and a disk having a spiral shaped circumference fixed to said shaft, a flexible pulling member fixed with one end to each crank arm and to said disk and adapted to be connected at its other end to a trough to be tilted, and means to impart a turning motion to said shaft to effect the raising and tilting of a trough, which means include a further disk fixed to said shaft, a rotatable arm, an electric motor to rotate said arm, and a flexible pulling member connected at one end to the circumference of said further disk and at its other end to the free end of said arm, said arm being in such an angular relationship to said disk and pulling member that the tilting position and the beginning of the lifting motion of the trough coincide with the two dead-center positions of the said arm.

3. A device for tilting the troughs, particularly of dough kneading and mixing machines, comprising in combination, a frame, a horizontal shaft mounted in said frame, two crank arms and a disk having a spiral shaped circumference fixed to said shaft, a flexible pulling member fixed with one end to each crank arm and to said disk and adapted to be connected at its other end to a trough to be tilted, and means to impart a turning motion to said shaft to effect the raising and tilting of a trough, which means include, a chain wheel fixed to said shaft, a further shaft, an arm fixed to said further shaft, an electric motor adapted to drive the latter, a chain fixed at one end to the circumference of said chain wheel and at its other end to the free end of said arm, said arm being in such an angular relationship to said disk and pulling member that the tilting position and the beginning of the lifting motion of the trough coincide with the two dead-center positions of the said arm.

In testimony whereof I have signed my name to this specification.

FRIEDRICH AESCHBACH.